No. 765,623. PATENTED JULY 19, 1904.
J. J. KOOMAN.
TRANSMITTING MECHANISM.
APPLICATION FILED JUNE 12, 1903.
NO MODEL. 3 SHEETS—SHEET 2.
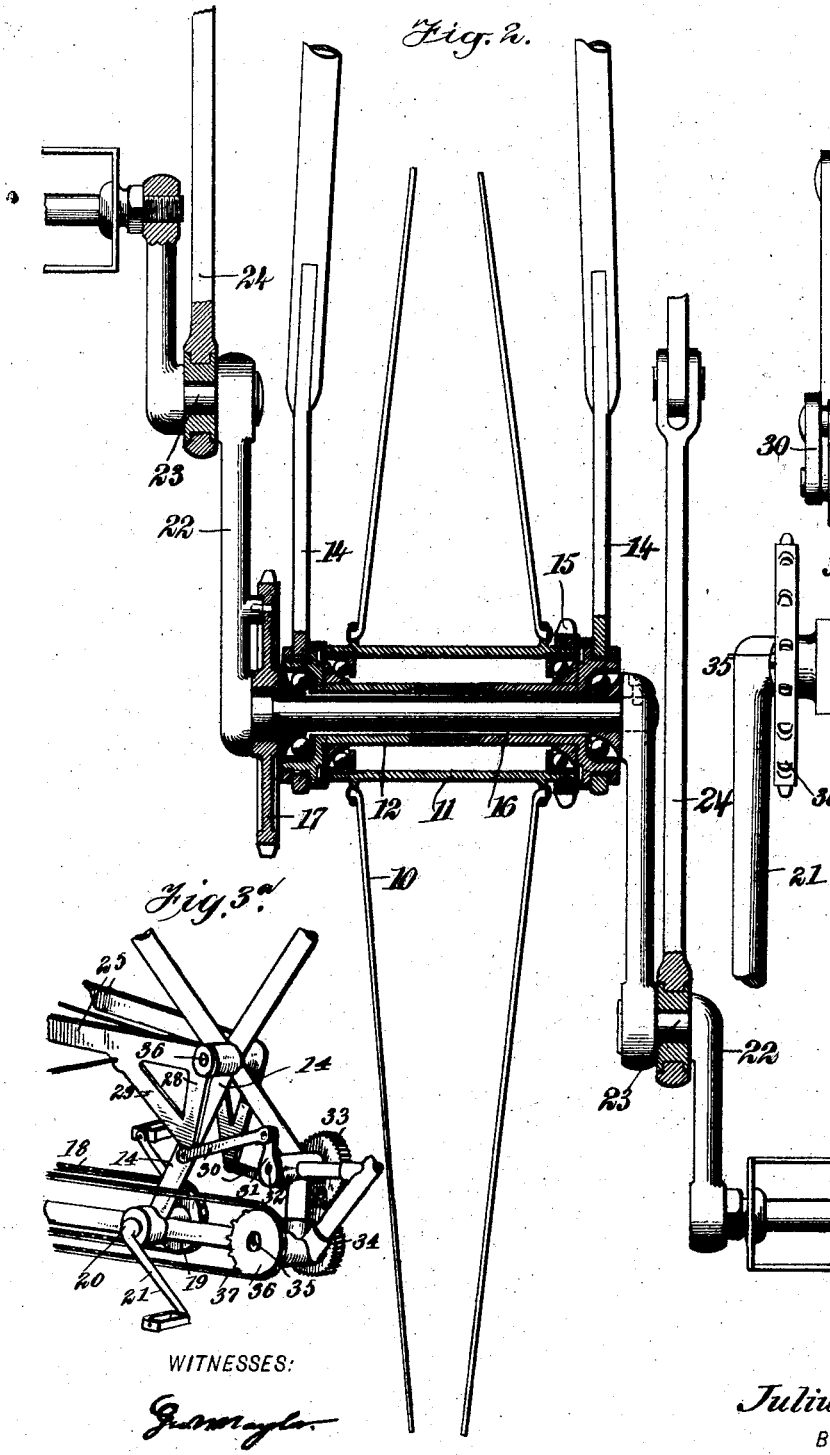
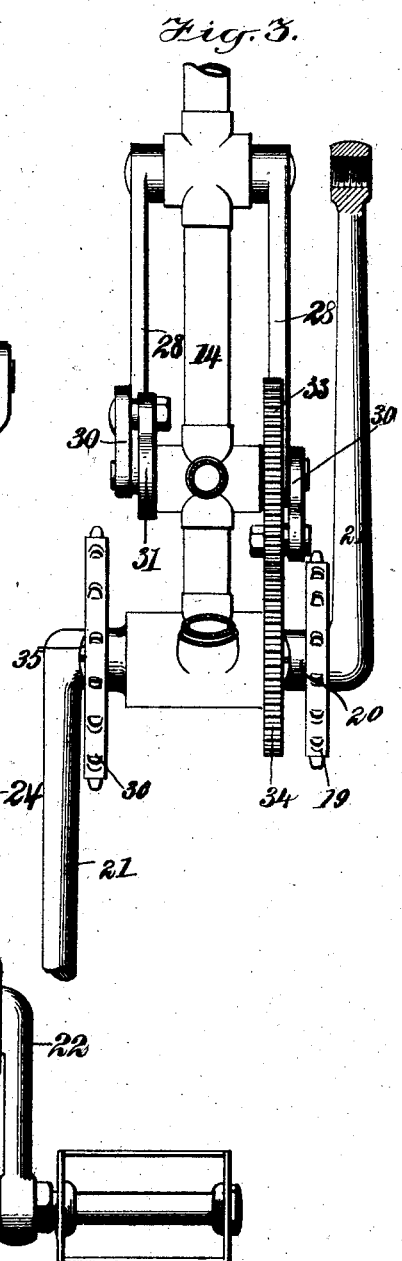
WITNESSES:
INVENTOR
Julius J. Kooman
BY
ATTORNEYS.

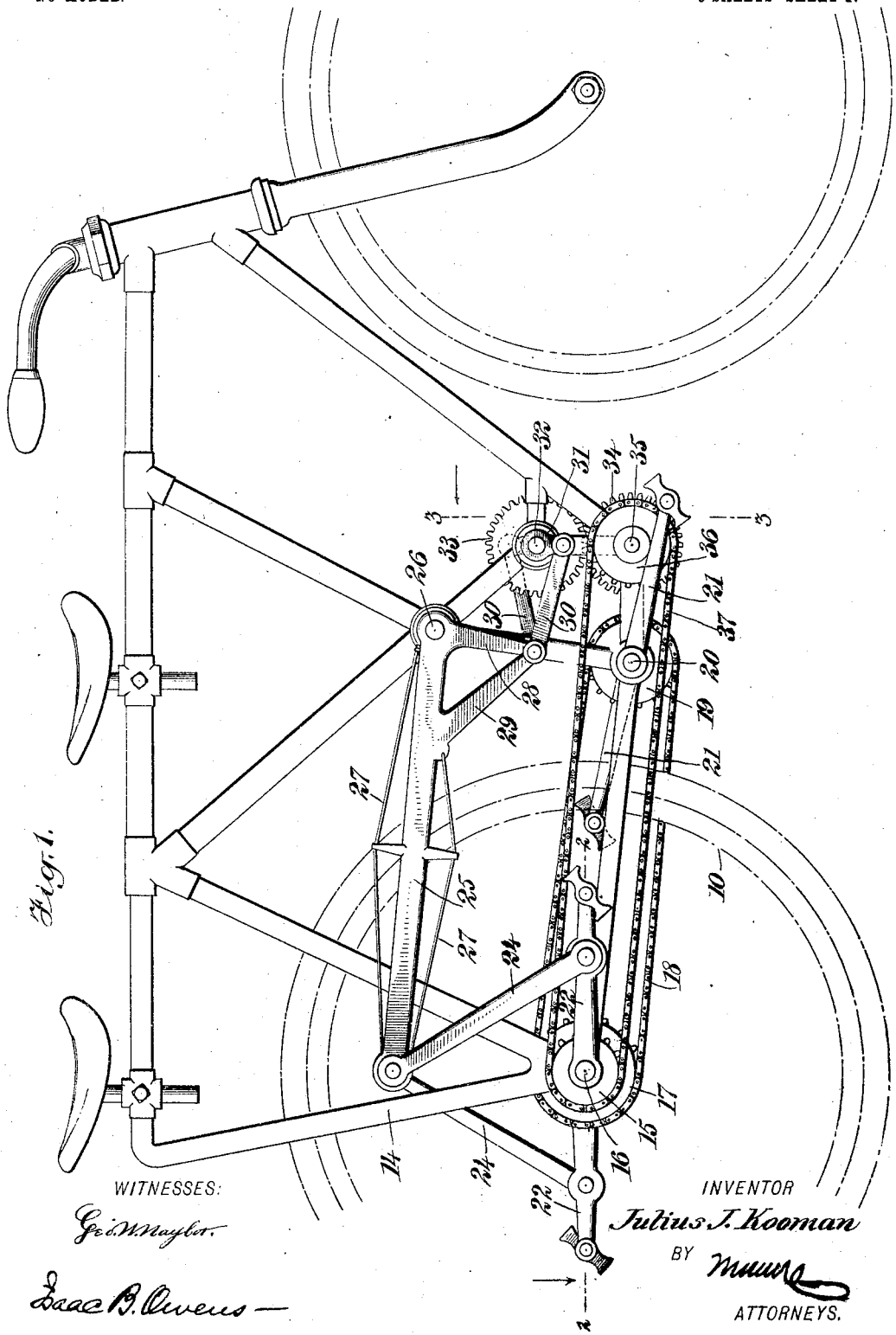

No. 765,623. PATENTED JULY 19, 1904.
J. J. KOOMAN.
TRANSMITTING MECHANISM.
APPLICATION FILED JUNE 12, 1903.
NO MODEL. 3 SHEETS—SHEET 3.

WITNESSES:
Geo. W. Naylor.
Isaac B. Owens.

INVENTOR
Julius J. Kooman
BY
ATTORNEYS.

No. 765,623. Patented July 19, 1904.

UNITED STATES PATENT OFFICE.

JULIUS JACOB KOOMAN, OF NEW YORK, N. Y.

TRANSMITTING MECHANISM.

SPECIFICATION forming part of Letters Patent No. 765,623, dated July 19, 1904.

Application filed June 12, 1903. Serial No. 161,171. (No model.)

*To all whom it may concern:*

Be it known that I, JULIUS JACOB KOOMAN, a citizen of the United States, and a resident of the city of New York, borough of Brooklyn, in the county of Kings and State of New York, have invented a new and Improved Transmitting Mechanism, of which the following is a full, clear, and exact description.

This invention relates to a gearing which may be used for the mechanical transmission of power for all purposes. It is here shown as employed in connection with a bicycle; but I desire it clearly understood that the invention is not so limited. It may be applied to engines, manual powers, and for any other purpose requiring the mechanical transmission of motion.

This specification is an exact description of one example of the invention, while the claims define the actual scope thereof.

Reference is to be had to the accompanying drawings, forming a part of this specification, in which similar characters of reference indicate corresponding parts in all the views.

Figure 4:
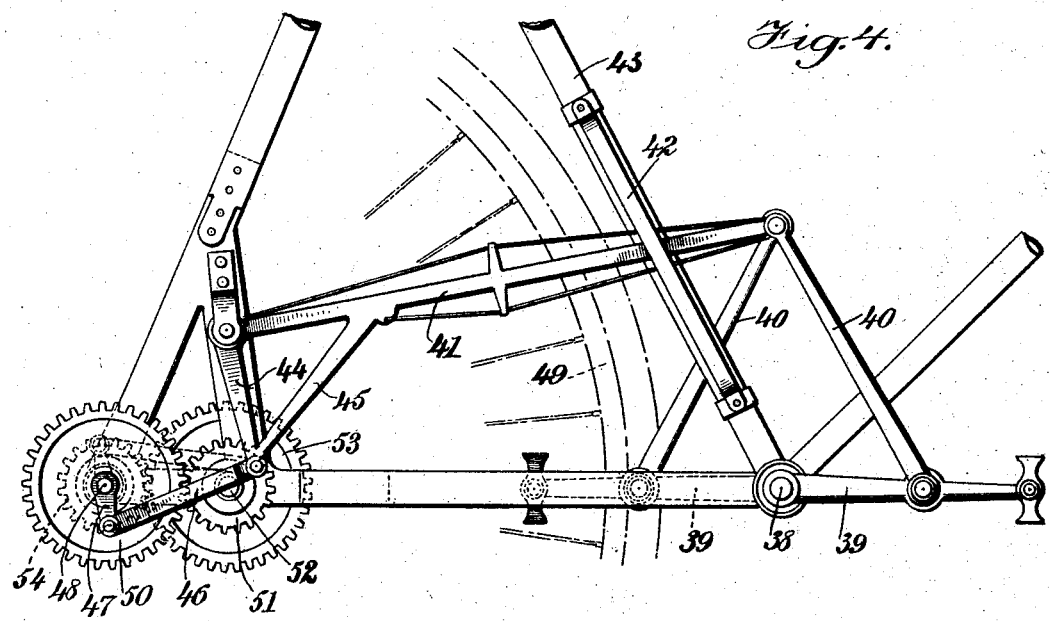

Figure 1 is a side elevation showing the invention applied to a tandem bicycle. Fig. 2 is a horizontal section on the line 2 2 of Fig. 1. Fig. 3 is a sectional elevation looking from the line 3 3 of Fig. 1, but showing the pedals vertical instead of horizontal, as in Fig. 1. Fig. 3ª is a fragmentary perspective view of the parts shown in Fig. 3. Fig. 4 is a fragmentary view showing the invention applied to a single-seat bicycle, and Fig. 5 is a rear elevation of the gearing shown in Fig. 4.

Referring to Figs. 1, 2, and 3, 10 indicates the rear or driving wheel of the bicycle, and 11 the hub thereof, this hub being mounted loosely on a sleeve 12, held rigidly in the frame 14 of the vehicle. On said hub 11 is secured a sprocket-wheel 15. 16 indicates a crank-shaft, which is mounted loosely in the sleeve 12, and 17 indicates a sprocket-wheel attached to said shaft. Over the sprocket-wheel 17 runs a chain 18, which extends forward over a sprocket-wheel 19, fastened to the front crank-shaft 20, said shaft 20 carrying the front cranks 21, which may be of the usual or any preferred construction. The rear cranks 22 are each provided with a wrist-pin 23, and said wrist-pins facilitate the connection with the crank-arms of links 24. These links are located one on each side of the machine and extend up, respectively, to the long arms 25 of elbow-levers fulcrumed at the point 26 and located one on each side of the machine. Said arms 25 of the elbow-levers are provided with trusses 27, which strengthen them, and the short arms 28 of the levers are braced against the long arms by means of diagonal struts 29. Said short arms 28 of the elbow-levers are respectively connected with links 30, which extend forward, one on a crank 31, fastened on the right-hand end of a shaft 32, and the other to a gear 33, fastened to the left-hand end of said shaft and serving the double purpose of a gear and crank. The gear 33 is in mesh with a gear 34, fastened to a shaft 35 below the shaft 32. Said shaft 35 also carries a sprocket-wheel 36, fast to the shaft, and over this wheel a chain 37 passes, the chain extending rearward to and around the before-described sprocket-wheel 15.

In the operation of the apparatus the power applied to the shaft 20 is transmitted to the rear crank-shaft 16, and being here reinforced by the power applied to the rear cranks 22 the aggregate power is transmitted by the links 24 to the elbow-levers, which, owing to the arrangement shown, exert great leverage on the shaft 32 and cause the same to be driven at a very high speed. From the shaft 32 the movement passes to the shaft 35 and from this shaft to the driving-wheel 10 by means of the geared elements 36, 37, and 15. This gearing provides for the exertion of great leverage on the part to be driven, and in case of the bicycle here illustrated it will enable the bicycle to be propelled at a high rate of speed with the expenditure of less energy than is commonly employed in this class of machinery.

Figure 5:
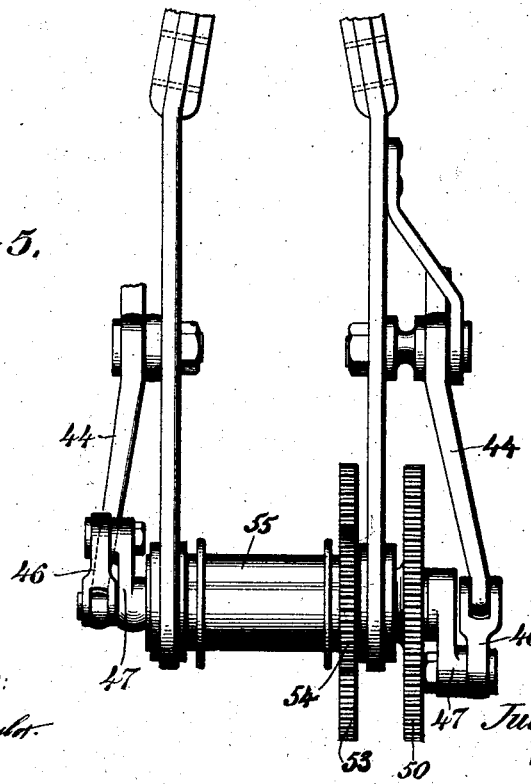

The construction shown in Figs. 4 and 5 does not differ essentially from that shown in Fig. 1, except that it shows the invention applied to a single-saddle machine. In Figs. 4 and 5, 38 indicates the crank-shaft, to which the cranks 39 are connected. The said cranks are connected to links 40, and these in turn are connected with the long arms of the elbow-levers 41, which levers are two in number and the long arms of which are guided by suitable straps 42, secured to the frame 43 of the bicycle. The long arms of the elbow-levers 41 are trussed, as before described, and their short arms 44 are braced by means of struts 45. These short arms have links 46 connected thereto, and said links are also connected to the cranks 47, fastened to the shaft 48, mounted in the rear portion of the frame 43, this shaft being in axial coincidence to the rear or driving wheel 49. The shaft 48 carries a spur-gear 50, which is in mesh with a pinion 51 on a stub-shaft 52, mounted in the frame just forward of the shaft 48. The shaft 52 also carries a spur-gear 53, which is in mesh with a pinion 54, fastened to the hub 55 of the driving-wheel. In this type of the invention the operation is the same as that before described, excepting that it is simplified, owing to the simplification of the operative parts. It should be understood that the frame of the bicycle is not an essential element of my invention. This may be constructed in any manner which is desirable or necessary.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination of an elbow-lever, a link connected to each end thereof, two revoluble shafts, and a crank on each of said shafts, the cranks having respectively connection with the elbow-lever, and said elbow-lever having one arm longer than the other and provided with truss-rods extending above and below it, the short arm of the lever being braced from the longer arm by a diagonally-extending strut.

2. The combination with two driving-shafts and with a rotary driven member, of gearing connecting the two driving-shafts, an elbow-lever having a long arm and a short arm, a connection between one driving-shaft and the long arm of the elbow-lever, a link connected to the short arm of the elbow-lever, a crank-shaft with which the link is connected to drive the crank-shaft, a second shaft, gears connecting the crank-shaft and the second shaft, and gearing extending between said second shaft and the said driven member.

3. The combination with two driving-shafts and a rotary driven member, of an elbow-lever having a long and a short arm, a connection between one driving-shaft and the long arm of the elbow-lever, a rotary shaft, gearing connecting said shaft with the short arm of the elbow-lever, said gearing including a link attached to the elbow-lever, and a crank-shaft connected to the link, gearing extending between the said rotary shaft and the said driven member, and gearing connecting the first-named driving-shaft with the second or remaining driving-shaft.

4. The combination with a rotary driving-shaft and a rotary driven member, of a crank connected to the driving-shaft, a link connected to the crank, an elbow-lever having a long and a short arm, the long arm being connected to the said link, a crank-shaft, a link connected to the short arm of the lever and to the said crank-shaft, and gearing connecting the said crank-shaft with the said rotary driven member.

In testimony whereof I have signed my name to this specification in the presence of two subscribing witnesses.

JULIUS JACOB KOOMAN.

Witnesses:
 REMSEN RUSHMORE,
 JACOB G. PREGENSER.